United States Patent
Kuehne

(10) Patent No.: US 9,873,378 B2
(45) Date of Patent: Jan. 23, 2018

(54) VEHICLE, DISPLAY SYSTEM AND METHOD FOR DISPLAYING A PIECE OF TRAFFIC-RELEVANT INFORMATION

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 65 days.

(21) Appl. No.: 14/602,640

(22) Filed: Jan. 22, 2015

(65) Prior Publication Data
US 2015/0206432 A1   Jul. 23, 2015

(30) Foreign Application Priority Data
Jan. 22, 2014   (DE) .................. 10 2014 000 803

(51) Int. Cl.
| | | |
|---|---|---|
| *B60R 1/00* | (2006.01) | |
| *G02B 27/01* | (2006.01) | |
| *G08G 1/0962* | (2006.01) | |

(52) U.S. Cl.
CPC .............. *B60R 1/00* (2013.01); *G02B 27/017* (2013.01); *G08G 1/0962* (2013.01); *B60R 2300/205* (2013.01); *G02B 2027/014* (2013.01); *G02B 2027/0138* (2013.01); *G02B 2027/0141* (2013.01); *G02B 2027/0178* (2013.01); *G02B 2027/0187* (2013.01)

(58) Field of Classification Search
CPC .......... G02B 27/017; G02B 2027/0141; G02B 2027/0138; G02B 2027/014; G02B 2027/0187; G02B 2027/0178; G08G 1/0962; B60R 1/00; B60R 2300/205

USPC .......................................... 345/7–9
See application file for complete search history.

(56) References Cited

U.S. PATENT DOCUMENTS

| | | | |
|---|---|---|---|
| 6,876,307 | B1 | 4/2005 | Spitzer et al. |
| 8,497,880 | B2 | 7/2013 | Victor et al. |
| 2002/0101568 | A1* | 8/2002 | Eberl ................... G02B 27/017 351/211 |
| 2005/0046953 | A1* | 3/2005 | Repetto ................ G02B 27/017 359/630 |
| 2010/0240988 | A1 | 9/2010 | Varga et al. |

(Continued)

FOREIGN PATENT DOCUMENTS

| | | |
|---|---|---|
| DE | 19802220 | 7/1999 |
| DE | 19952506 | 6/2001 |

(Continued)

OTHER PUBLICATIONS

German Office Action for German Priority Patent Application No. 10 2014 000 803.7, dated Oct. 8, 2014, 5 pages.

*Primary Examiner* — Amare Mengistu
*Assistant Examiner* — Gloryvid Figueroa-Gibson
(74) *Attorney, Agent, or Firm* — Staas & Halsey LLP

(57) ABSTRACT

A display system has a control apparatus and a display unit that can be worn on the head of a vehicle user. The control apparatus has an input interface for accepting a piece of traffic-relevant information, a transducer for producing an image signal for the display unit taking account of the piece of traffic-relevant information and an output interface for outputting an image signal. The display system is prepared to display the piece of traffic-relevant information by the display unit in a marginal region of a field of vision of the vehicle user. A vehicle has the display system.

16 Claims, 3 Drawing Sheets

(56) References Cited

U.S. PATENT DOCUMENTS

| | | | | |
|---|---|---|---|---|
| 2010/0253541 A1* | 10/2010 | Seder | ............... | G01S 13/723 |
| | | | | 340/905 |
| 2010/0253594 A1* | 10/2010 | Szczerba | ............ | G01S 13/723 |
| | | | | 345/7 |
| 2013/0076787 A1* | 3/2013 | Mathieu | ............... | B60R 1/00 |
| | | | | 345/633 |

FOREIGN PATENT DOCUMENTS

| | | |
|---|---|---|
| DE | 102004057947 | 6/2006 |
| DE | 10 2014 000 803.7 | 1/2014 |
| EP | 0338703 | 10/1989 |
| EP | 1510849 | 3/2005 |
| EP | 2221654 | 8/2010 |
| WO | 2013/029020 | 2/2013 |

\* cited by examiner

VEHICLE, DISPLAY SYSTEM AND METHOD FOR DISPLAYING A PIECE OF TRAFFIC-RELEVANT INFORMATION

CROSS REFERENCE TO RELATED APPLICATIONS

This application is based on and hereby claims priority to German Application No. 10 2014 000 803.7 filed on Jan. 22, 2014, the contents of which are hereby incorporated by reference.

BACKGROUND

The present invention relates to a display system having a control apparatus and a display unit that can be worn on the head of a vehicle user.

In addition, the invention relates to a vehicle that comprises such a display system. The vehicle may be a land vehicle, an air vehicle, a space vehicle and/or a water vehicle, for example. In particular, the vehicle may be an automobile, a bus or a heavy goods vehicle.

Furthermore, the invention relates to a method for displaying a piece of traffic-relevant information by a display unit that can be worn on the head of a vehicle user.

U.S. Pat. No. 8,497,880 B2 discloses a system for displaying a current vehicle speed and a current speed limit by a display that is mounted on a pair of spectacles. The display is effected in a peripheral visual range of the wearer of the spectacles. The line of vision of the wearer of the spectacles is sensed by a camera that is mounted on the dashboard. In relation to the line of vision, the speed indication is always presented to the side of the current line of vision, but in a size and in a proximity to the location of sharpest vision that is currently still sufficient for the wearer of the spectacles to be able to read the speed indication. The effect brought about by the known system for displaying the speed indication is thus that the speed indication is always moved out of the center of sharp vision (foveal vision), specifically regardless of where the wearer is currently looking. Hence, the speed indication is always presented to the side of the current line of vision (that is to say in a marginal region of a field of view) of the wearer of the spectacles. If the wearer of the spectacles makes a vain attempt to fix his eyes on the information presented at the side, this can lead to his being distracted from the traffic scenario by the display that evades his sight. Such a sight-evading display can unnecessarily tire the driver of a vehicle and therefore also contribute to a traffic hazard.

SUMMARY

It is one possible object to provide a display system that distracts the wearer of the spectacles from the traffic scenario to a lesser degree and tires him less than the known system for displaying a piece of traffic-relevant information (for example speed indication). Furthermore, it is a potential object to provide a corresponding method and a vehicle having such a display system.

The inventors propose a display system having a control apparatus and a display unit that can be worn on the head of a vehicle user. The control apparatus comprises an input interface for accepting a piece of traffic-relevant information, a transducer for producing an image signal for the display unit taking account of the piece of traffic-relevant information and an output interface for outputting the image signal. The display system is prepared to display the piece of traffic-relevant information by the display unit in a marginal region of a field of vision of the vehicle user.

In relation to the vehicle, the inventors propose a vehicle comprising the proposed display system.

In relation to the method for displaying a piece of traffic-relevant information by a display unit that can be worn on the head of a vehicle user, the inventors propose the method comprising: acceptance of a piece of traffic-relevant information, production of an image signal for the display unit taking account of the piece of traffic-relevant information, and display of the piece of traffic-relevant information by the display unit in a marginal region of a field of vision of the vehicle user.

A concept of the proposals can be regarded as being that the piece of traffic-relevant information is displayed in a marginal region of a field of vision of the vehicle user. As a result, the vehicle user remains free to look at the displayed piece of information naturally by orienting his eyes in the region of sharp vision (i.e. in the foveal portion of his field of view) too. The known system for displaying a piece of traffic-relevant information denies him this opportunity because the speed indication is always moved out of the center of sharp vision, specifically regardless of where the wearer is currently looking. Since the display system permits the driver to look at the displayed piece of information naturally by orienting his eyes in the region of sharp vision (i.e. in the foveal portion of his field of view) too, the driver is distracted from the traffic scenario to a lesser degree, and he becomes less tired than when using the known system for displaying a speed indication. Field of vision denotes that region on which the eyes can be fixed centrally in succession. In this case, field of view is understood to mean the total quantity of all central and peripheral directions in which objects (for example points of light) can be visually perceived when the posture of the head is steady and straight and the vision is directed straight ahead without moving. This does not require the eyes to be fixed on the objects to be perceived.

In a preferred embodiment, the piece of traffic-relevant information comprises a warning about a looming speed violation by a vehicle that contains the vehicle user. The fact that a speed violation by the vehicle is looming can be ascertained by the control apparatus, for example by taking account of map data about maximum permissible speeds by evaluating the current whereabouts (and possibly also the scheduled path of travel) and the current speed of the vehicle. A piece of information about the level of current acceleration by the vehicle and/or information about roads and weather conditions can also be included in the evaluation. In particular, it is also possible to take account of speed limits that are dependent on the day of the week or the time of day.

It is particularly preferred if the piece of traffic-relevant information comprises a warning about an arisen speed violation by a vehicle that contains the vehicle user. The fact that a speed violation has arisen and is persistent can be ascertained by the control apparatus, for example by taking account of map data about maximum permissible speeds by evaluating the current whereabouts (and possibly also the scheduled path of travel) and the current speed of the vehicle. It is also possible for a piece of information about weather conditions to be included in the evaluation. In particular, it is also possible to take account of speed limits that are dependent on the day of the week or on the time of day.

It may be advantageous if the piece of traffic-relevant information comprises a piece of information about a level of a speed of a vehicle that contains the vehicle user. As a result, the vehicle user is able to establish the current vehicle speed by simply changing his line of vision, without averting his vision from the traffic scenario for an unnecessarily long time in order to do so.

It may also be advantageous if the display system is prepared to present the piece of traffic-relevant information only when a speed violation is looming or persistent. As a result, the vehicle user is relieved of having to perceive the piece of traffic-relevant information for as long as the perception thereof has no urgency for him. This development can also help to avoid unnecessary tiring of the driver and an accompanying traffic hazard as far as possible. The fact that a speed violation by the vehicle is looming or persistent can be ascertained by the control apparatus, for example by taking account of map data about maximum permissible speeds by evaluating the current whereabouts (and possibly also the scheduled path of travel) and the current speed of the vehicle. A piece of information about the level of current acceleration by the vehicle and/or information about roads and weather conditions can also be included in the evaluation. In particular, it is also possible to take account of speed limits that are dependent on the day of the week or on the time of day.

It is preferred if the display system is prepared to present the piece of traffic-relevant information when a speed violation has arisen and is persistent. This relieves the vehicle user of having to perceive the piece of traffic-relevant information for as long as perception thereof has no urgency for him. This development can also help to avoid unnecessary tiring of the driver and an accompanying traffic hazard as far as possible. The fact that a speed violation has arisen and is persistent can be ascertained by the control apparatus, for example by taking account of map data about maximum permissible speeds by evaluating the current whereabouts (and possibly also the scheduled path of travel) and the current speed of the vehicle. A piece of information about the level of current acceleration by the vehicle and/or information about roads and weather conditions can also be included in the evaluation. In particular, it is also possible to take account of speed limits that are dependent on the day of the week or on the time of day.

It may be advantageous if the transducer comprises a first circuit that is part of vehicle electronics of a vehicle. This makes it possible to ensure that the first circuit is electrically and/or functionally best attuned to other portions of vehicle electronics that interact with the display system.

In an alternative or additional development, the transducer comprises a second circuit that is part of the display unit. This makes it possible to ensure that the first circuit is electrically and/or functionally best attuned to other portions of the display unit that interact with the display system.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
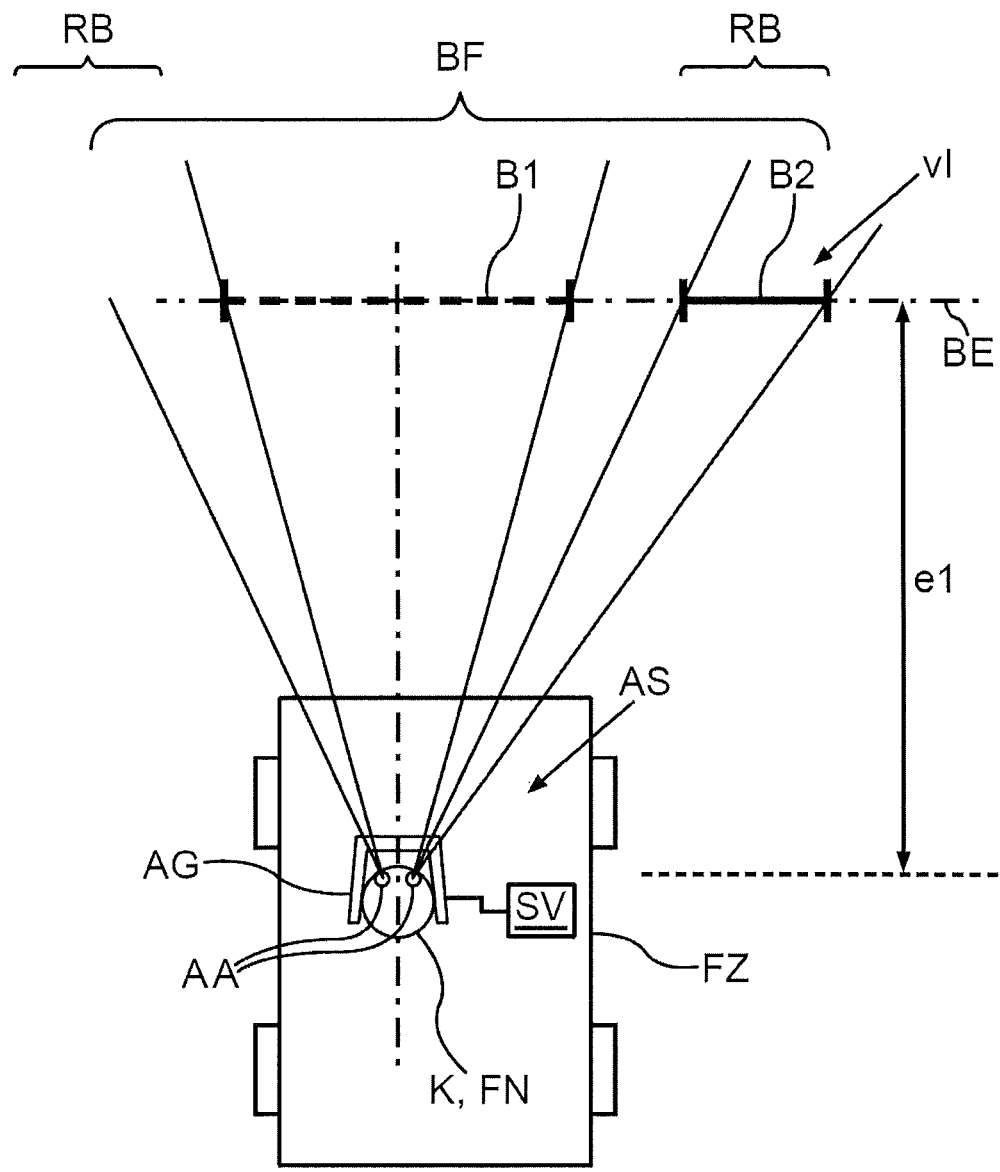
FIG. 1 schematically shows a vehicle with a display system that has a pair of augmented reality spectacles and a control apparatus for the augmented reality spectacles.

Reference will now be made in detail to the preferred embodiments of the present invention, examples of which are illustrated in the accompanying drawings, wherein like reference numerals refer to like elements throughout.

FIG. 1 shows a vehicle FZ with a display system AS that has a pair of augmented reality spectacles AG and a control apparatus SV for the augmented reality spectacles AG. The vehicle FZ, which is moving, has a vehicle user FN sitting in it who is wearing a pair of augmented reality spectacles AG on his head K and controls the vehicle FZ. The vehicle user FN looks at the traffic scenario in a field of vision BF in which he looks (stares) by positioning his eyeballs AA unconsciously and/or consciously in different directions. The vehicle user FN looks at the traffic scenario directly or by a virtual first image B1 that is presented to him by the augmented reality spectacles AG. If the first image B1 is a virtual image B1, an image plane BE of the first image B1 (see dashed line in bold font) is at a distance e1 in front of the eyes AA of the vehicle user FN. A display system of the augmented reality spectacles AG is used to show the vehicle user FN at least one piece of traffic-relevant information vl. The piece of traffic-relevant information vl is presented to the vehicle user FN by the augmented reality spectacles AG in a marginal region RB of his field of vision BF (see solid line in bold font).

Figure 2:
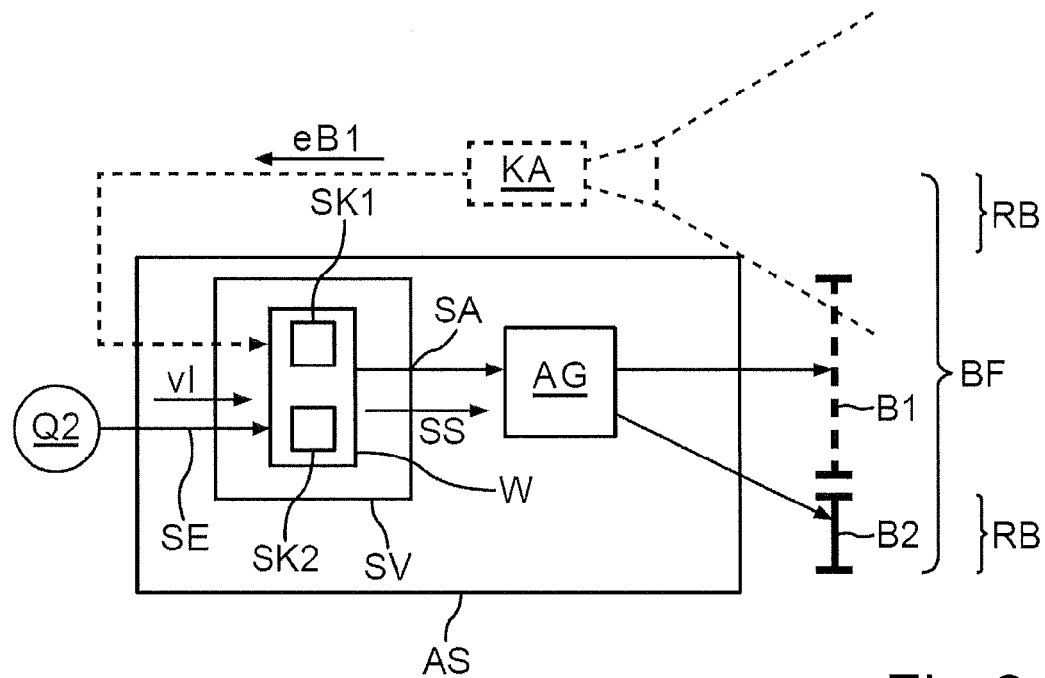
FIG. 2 schematically shows a block diagram with an optional camera, an information source for a piece of traffic-relevant information and a display system that has a pair of augmented reality spectacles and a control apparatus for the augmented reality spectacles.

FIG. 2 shows a display system AS and an information source Q2 for a piece of traffic-relevant information vl. The display system AS has a pair of augmented reality spectacles AG and a control apparatus SV for the augmented reality spectacles AG. The control apparatus SV comprises a transducer W that is prepared to take the piece of traffic-relevant information vl that the information source Q2 provides and produce an electronic image signal SS that the augmented reality spectacles AG take as a basis for displaying the piece of traffic-relevant information vl in a marginal region RB of the field of vision BF of the vehicle user FN. The transducer W may include a first circuit SK1 that is part of (connected to or communicates with) the vehicle electronics of a vehicle. Alternatively or additionally, the transducer W may include a second circuit SK2 that is part of (connected to or communicates with) a display device (e.g., the augmented reality spectacles AG). The control apparatus SV may also include an input interface (communication interface) SE for accepting or receiving a piece of traffic-relevant information vl, and an output interface SA for outputting an image signal SS (e.g., to the augmented reality spectacles AG).

Optionally, a camera KA (for example a camera for problematic weather conditions such as night, fog, rain, smog) is provided that can be used to take an electronic image eB1 (for example an infrared image and/or radar image) of a traffic scenario. The augmented reality spectacles AG can be used to present the vehicle user FN with the electronic image eB1 in a central region BFz of his field of vision BF as a first visually perceptible image B1 for the purpose of observing the traffic scenario.

Figure 3:
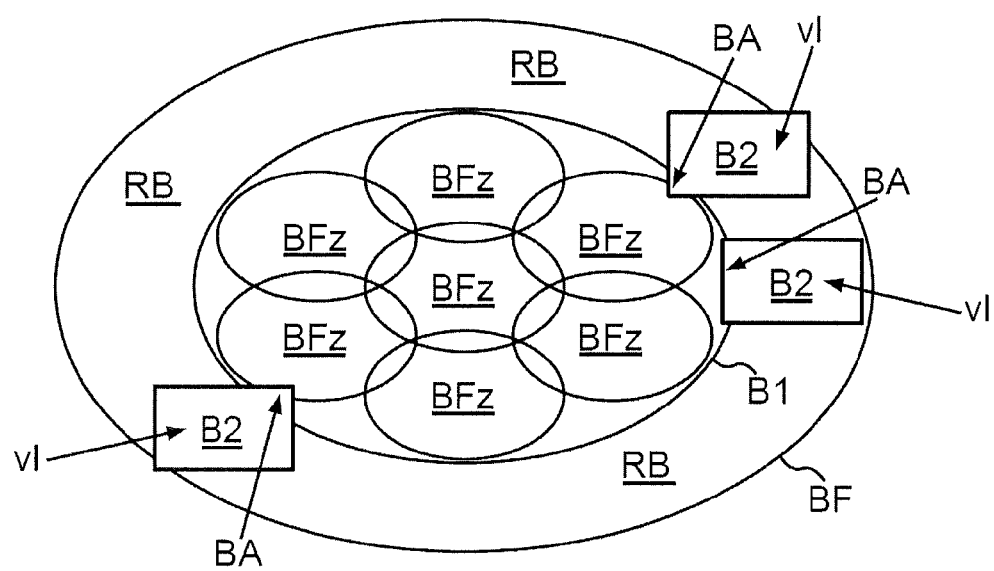
FIG. 3 schematically shows an arrangement for a second electronic image in a marginal region of a field of vision of a vehicle user.

FIG. 3 schematically shows an arrangement for the second image B2 with the piece of traffic-relevant information vl in a marginal region RB of a field of vision BF of a vehicle user FN. The central ellipses schematically show the possible central regions BFz of the field of vision BF of the vehicle user FN onto which the vehicle user FN typically focuses his vision when observing the traffic scenario, and which he can thus observe alternately with foveal vision. In the region BA, which contains the second image B2 with the piece of traffic-relevant information vl and which is superimposed on the first image B1, the first image B1 is cut out. Alternatively, the first image B1 has content from the second image B2 superimposed on it at that point. Hence, the first image B1 (of the traffic scenario) forms an image background for the second image B2 (with the piece of traffic-relevant information vl).

Figure 4:
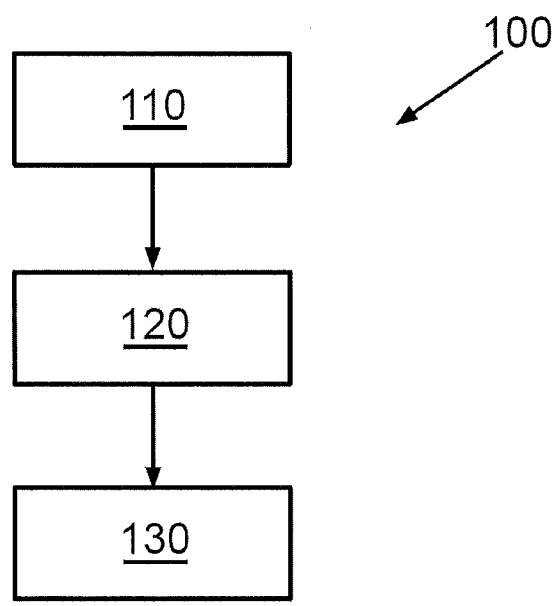
FIG. 4 schematically shows a sequence for a method for displaying a piece of traffic-relevant information by a display unit that can be worn on the head of a vehicle user.

FIG. 4 shows a method 100 for displaying a piece of traffic-relevant information vl by a display unit AG that can be worn on the head K of a vehicle user FN. The method 100 comprises the following. In a first part 110, the piece of traffic-relevant information vl is accepted. In a second part 120, an image signal SS is produced for the display unit AG taking account of the traffic-relevant information vl. In a third part 130, a piece of traffic-relevant information vl is displayed by the display unit AG in a marginal region RB of a field of vision BF of the vehicle user FN.

Augmented reality spectacles will become ever more widespread for the use of vehicles. A useful integration with a vehicle FZ may involve a speed violation that has arisen or is looming prompting a speed warning and/or an indication of a vehicle speed to be shown on a virtual display that is situated in a marginal region RB of a field of vision BF of the driver FN of the vehicle FZ. This allows the driver FN to be notified discreetly of a violation of the maximum permitted speed without thereby distracting him from the traffic scenario to an unnecessarily great extent or even thereby prompting him to avert his vision from the traffic scenario completely.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

What is claimed is:

1. A display system for a vehicle, comprising:
a control apparatus; and
a display device which is wearable on a head of a user of the vehicle,
wherein the control apparatus comprises:
a communication interface to receive traffic-relevant information;
a transducer to generate an image signal for the display device using the traffic-relevant information; and
an output interface to output the image signal,
wherein the traffic-relevant information is displayed by the display device in a marginal region of a field of vision of the user, the field of vision being a total of all regions that can be visually perceived by the user, by moving the user's eyes, wherein
the traffic-relevant information is displayed in a static position with respect to the display device that does not change when the traffic-relevant information is presented, regardless of viewing direction and line of sight of the user of the vehicle,
the traffic-relevant information is displayed in the marginal region of the field of vision of the user while the line of sight of the user is oriented toward a traffic scenario,
the traffic-relevant information is displayed in a foveal region of a field of view of the user when the line of sight of the user is oriented away from the traffic scenario toward the traffic-relevant information, the field of view including all central and peripheral objects that can be visually perceived by the user, without moving the user's eyes and without moving the user's head, and
the traffic-relevant information is maintained displayed in the marginal region of the field of vision while being displayed in the foveal region of the field of view.

2. The display system according to claim 1, wherein the traffic-relevant information comprises a warning about a looming speed violation by the vehicle.

3. The display system according to claim 1, wherein the traffic-relevant information comprises a warning about a current speed violation by the vehicle.

4. The display system according to claim 1, wherein the traffic-relevant information comprises information about a current speed of the vehicle.

5. The display system according to claim 1, wherein the display device displays the traffic-relevant information only when a speed violation is about to occur or is ongoing for a predetermined time period.

6. The display system according to claim 5, wherein the control apparatus determines that the speed violation is about to occur or is ongoing based on at least one of map data which includes maximum permissible speeds, a current speed information of the vehicle, a level of acceleration of the vehicle, a current location of the vehicle, a predicted path of the vehicle, weather conditions, road conditions, traffic conditions, and time of day.

7. The display system according to according to claim 6, further comprising at least one camera to produce extracted information that includes at least one of weather conditions, road conditions, and traffic conditions, by capturing at least one of an infrared image, radar image, and visible image of an environment external to the vehicle, and to provide the extracted information to the control apparatus.

8. The display system according to claim 1, wherein the display device displays the traffic-relevant information when a speed violation has arisen and continues for a predetermined time period.

9. The display system according to claim 1, wherein the transducer comprises a circuit that is part of vehicle electronics of the vehicle.

10. The display system according to claim 1, wherein the transducer comprises a circuit that is part of the display device.

11. The display system according to claim 1, wherein the display device includes augmented reality spectacles.

12. The display system according to claim 11, wherein the augmented reality spectacles display a first electronic image of a traffic scenario in a foveal region of a field of view of the user while eyes of the user are oriented in a direction at which a traffic scenario is expected to be, the field of view including all central and peripheral objects that can be visually perceived by the user, without moving the user's eyes and without moving the user's head, the augmented reality spectacles display a second electronic image including the traffic-related information in the marginal region of the field of vision of the user while the eyes of the user are oriented in the direction at which the traffic scenario is expected to be.

13. The display system according to claim 12, wherein the second electronic image is superimposed on the first electronic image.

14. A vehicle, comprising,
a mechanical device to provide a motive force to move the vehicle; and
a display system, the display system comprising:
  a control apparatus; and
  a display device which is wearable on a head of a user of the vehicle,
  wherein the control apparatus comprises:
    a communication interface to receive traffic-relevant information;
    a transducer to generate an image signal for the display device using the traffic-relevant information; and
    an output interface to output the image signal,
  wherein the traffic-relevant information is displayed by the display device in a marginal region of a field of vision of the user, the field of vision being a total of all regions that can be visually perceived by the user, by moving the user's eyes, wherein
  the traffic-relevant information is displayed in a static position with respect to the display device that does not change when the traffic-relevant information is presented, regardless of viewing direction and line of sight of the user of the vehicle,
  the traffic-relevant information is displayed in the marginal region of the field of vision of the user while the line of sight of the user is oriented toward a traffic scenario,
  the traffic-relevant information is displayed in a foveal region of a field of view of the user when the line of sight of the user is oriented away from the traffic scenario toward the traffic-relevant information, the field of view including all central and peripheral objects that can be visually perceived by the user, without moving the user's eyes and without moving the user's head, and
  the traffic-relevant information is maintained displayed in the marginal region of the field of vision while being displayed in the foveal region of the field of view.

15. The vehicle according to claim 14, wherein the transducer comprises at least one of a first circuit which is part of vehicle electronics of the vehicle, and a second circuit which is part of the display device.

16. A method for displaying a piece of traffic-relevant information by using a display device which is wearable on a head of a user of the vehicle, the method comprising:
  receiving traffic-relevant information;
  generating an image signal for the display device, using the traffic-relevant information; and
  displaying, by the display device, the traffic-relevant information in a marginal region of a field of vision of the vehicle user, the field of vision being a total of all regions that can be visually perceived by the user, by moving the user's eyes, wherein
  the traffic-relevant information is displayed in a static position with respect to the display device that does not change when the traffic-relevant information is presented, regardless of viewing direction and line of sight of the user of the vehicle,
  the traffic-relevant information is displayed in the marginal region of the field of vision of the user while the line of sight of the user is oriented toward a traffic scenario,
  the traffic-relevant information is displayed in a foveal region of a field of view of the user when the line of sight of the user is oriented away from the traffic scenario toward the traffic-relevant information, the field of view including all central and peripheral objects that can be visually perceived by the user, without moving the user's eyes and without moving the user's head, and
  the traffic-relevant information is maintained displayed in the marginal region of the field of vision while being displayed in the foveal region of the field of view.

* * * * *